April 17, 1951            G. BRANDT            2,549,166
REAR FENDER GUARD FOR PICKUP TRUCKS
Filed Jan. 28, 1949
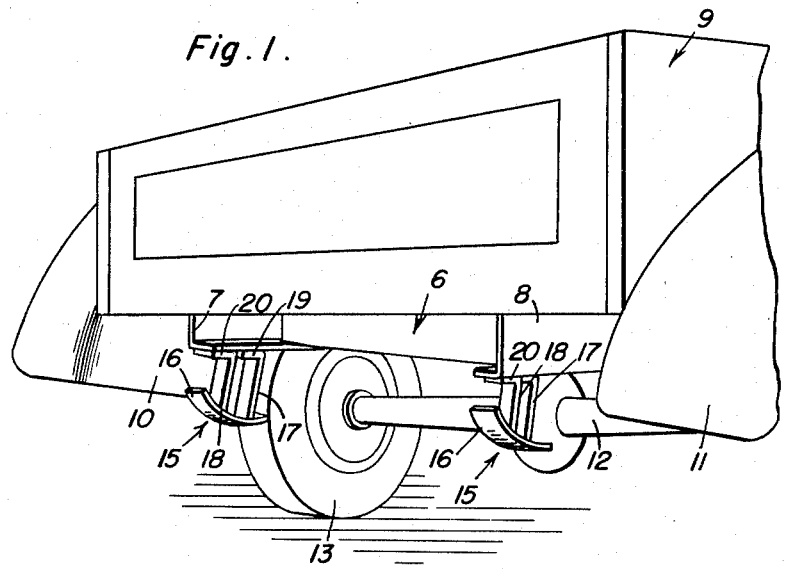
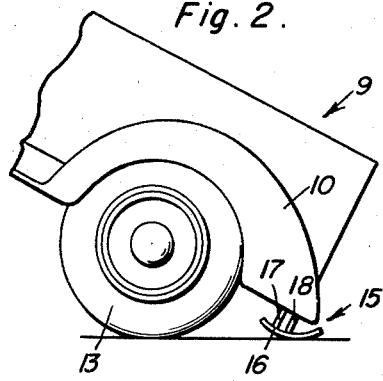
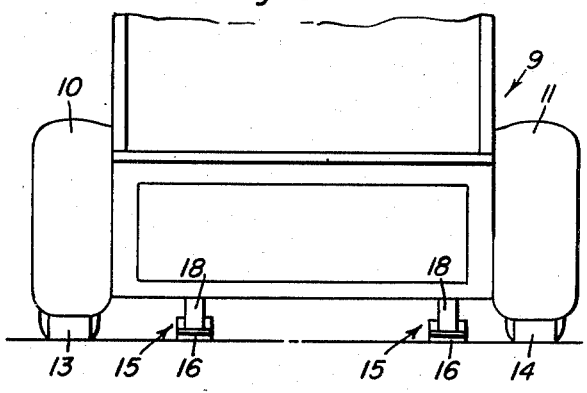
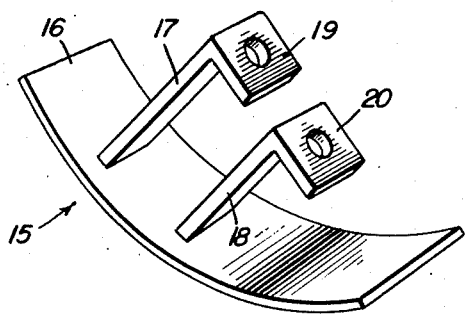
Gideon Brandt
INVENTOR.

Patented Apr. 17, 1951

2,549,166

UNITED STATES PATENT OFFICE 2,549,166

REAR FENDER GUARD FOR PICKUP TRUCKS

Gideon Brandt, Kramer, N. Dak.

Application January 28, 1949, Serial No. 73,332

1 Claim. (Cl. 298—17)

This invention relates to fender guards which are especially, but not necessarily, designed and constructed for use on the chassis of a so-called pick-up truck, the type of truck used for hauling and unloading grain into a warehouse elevator.

It is a matter of common knowledge that the rear fenders and rear end of the chassis frame are subjected to considerable wear, tear and damage during the grain-unloading step because when the truck body is tilted to dumping position said parts frequently come into wiping contact with relatively moving parts of the elevator conveyor. To visualize how this comes about, picture the front end of a loaded pick-up truck propped up on a hoist and the rear end tilting into close proximity to the moving flights of the usual type conveyor. Since these types of trucks are usually about one-ton capacity and the front end is lifted six or more feet in the air, the rear end of the frame and rear ends of the adjacent rear fenders often tilt so low that the conveyor flights rake and scrape same and this condition, obviously, damages not only the elevator but rips and damages the rear fenders.

The problem has been what to do about the stated difficulties and so, after due deliberation and consideration, I have evolved and produced a satisfactory solution in that I provide a pair of simple and practical stop-check attachments and install same at points of vantage so that the degree of tilt of the rear end of the truck is limited and the fenders are prevented from coming into dragging contact with underlying portions of the grain elevator. In so doing, I protect and prolong the utility of frame, fenders and grain elevator.

Although wanted results may perhaps be attainable through the medium of means other than prescribed by me, I find that my objectives are well served by way of two properly made check-stops which take the form of curvate shoes having sturdy struts whereby said shoes may be securely anchored on the rear ends of the usual channel-irons of the chassis frame, said shoes to come into rubbing contact with the grain conveyor should the truck be tilted to an undesirable fender-damaging angle.

It will be evident from the foregoing that the object of the invention is to provide a pair of simple and economical fixtures which are readily anchorable in out-of-the-way positions on the rear terminal ends of the channel-irons of the stated pick-up truck which do not in any way interfere with regular and orderly handling and movement of the truck but are ever-set and ready to come into play when the truck body is in dumping or unloading position and in case the front end is hoisted to an elevation which would otherwise bring the fenders and rear end of the chassis into disruptive relationship with the associable parts of said elevator.

Other objects and advantages will become more readily apparent from the following description and the accompanying illustrative drawings.

In the drawings, wherein like numerals are employed to designate like parts throughout the views:

Figure 1 is a fragmentary perspective view showing the rear end of a conventional-type pick-up truck, with parts omitted, and illustrating my improved check-stop attachment in elevated but ready-to-function position;

Figure 2 is a fragmentary side elevational view showing the truck tilted and the attachment in operative position;

Figure 3 is a rear end elevation of the structure seen in Figure 2, that is, a view observing Figure 2 in a direction from right to left; and Figure 4 is a perspective view of one of the fixtures by itself.

Referring now to the drawings by distinguishing reference numerals and lead lines, the chassis is denoted, generally visualized, by the numeral 6 and includes customary longitudinal side or channel-irons 7 and 8. The body, which is of conventional form, is denoted by the numeral 9 and the rear fenders are denoted by the numerals 10 and 11. The rear axle structure is denoted at 12 and the rear wheels by the numerals 13 and 14. These are conventional parts of a light-duty one-ton or equivalent truck used in and around a warehouse and especially used for hauling and loading grain into the warehouse by way of a suitable conveyor-type elevator (not shown).

The check-stop attachments or fixtures are denoted by the numerals 15 and 16 and are attachable to left and right rear end portions of the chassis. A description of one will suffice for both and attention is therefore directed to Figure 4 wherein it will be seen that the attachment is a one-piece casting or equivalent unit and comprises a rectangular plate which is arcuately bent and defines a stop shoe 16. Attached to and extending from right angles from the intermediate portion are long and short struts or arms 18 having properly bent lateral end portions 19 and 20 provided with bolt holes whereby said ends may be bolted to the lower flanges of the channel-irons 7 and 8 adjacent to the rear ends of said channel-irons as shown in Figure 1.

It is to be noted that the shoes are properly curved to present a minimum of contacting surface to the flights or other parts of the elevator (not shown) while at the same time providing the desired checking results. Thus, the convex surfaces face downwardly and, conversely, the concaved sides face upwardly. By having the struts 17 and 18 of varying length, the shoes occupy the desired rearwardly and downwardly canted positions. It will be further noted that the shoes are at the rear terminal ends of the channel-irons 7 and 8 and their rear ends project slightly beyond the channel-irons. Then, too, it will be seen that the shoes take positions inwardly of the rear wheels 13 and 14 and occupy planes below the plane of the rear terminal ends of the fenders 10 and 11. These brackets are appropriate to fit virtually any make of a pick-up truck in the one-ton or equivalent class.

As stated, the stop shoes provide effective protectors for both the chassis frame and rear fenders while unloading grain into an elevator and under such circumstances that the hoisted end of the truck swings the rear end of the frame and rear ends of the rear fenders into disruptive contact with moving parts of the elevator. Experience has shown that pick-up trucks not provided with protectors are constantly subjected to fender damage.

While in the foregoing there has been shown and described the preferred embodiment of this invention, it is to be understood that minor changes in the details of construction, combination and arrangement of parts may be resorted to without departing from the spirit and scope of the invention as claimed.

Having described the invention, what is claimed as new is:

A fender guard attachment for the rear end portion of a pick-up truck comprising a rigid relatively broad arcuately shaped stop shoe having concaved and convexed sides, the concaved side of said shoe having integrated struts of varying lengths and vertically disposed when the truck chassis is in a horizontal position, said struts extending laterally from the intermediate portions of said shoe, the latter having laterally bent end portions which are adapted to be fastened to a channel-iron forming part of the truck chassis.

GIDEON BRANDT.

REFERENCES CITED

The following references are of record in the file of this patent:

UNITED STATES PATENTS

| Number | Name | Date |
| --- | --- | --- |
| 1,096,350 | Brown | May 12, 1914 |
| 1,171,578 | Albrecht | Feb. 15, 1916 |
| 1,507,008 | Stone | Sept. 2, 1924 |
| 2,217,871 | Lindgren | Oct. 15, 1940 |